(12) United States Patent
Han et al.

(10) Patent No.: US 12,223,279 B2
(45) Date of Patent: Feb. 11, 2025

(54) METHOD FOR GENERATING CROSS-LINGUAL TEXTUAL SEMANTIC MODEL, AND ELECTRONIC DEVICE

(71) Applicant: BEIJING BAIDU NETCOM SCIENCE TECHNOLOGY CO., LTD., Beijing (CN)

(72) Inventors: Yaqian Han, Beijing (CN); Shuohuan Wang, Beijing (CN); Yu Sun, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 335 days.

(21) Appl. No.: 18/054,608

(22) Filed: Nov. 11, 2022

(65) Prior Publication Data
US 2023/0080904 A1   Mar. 16, 2023

(30) Foreign Application Priority Data
Dec. 29, 2021   (CN) .......................... 202111647494.9

(51) Int. Cl.
*G06F 40/30* (2020.01)
*G06N 5/022* (2023.01)

(52) U.S. Cl.
CPC ............. *G06F 40/30* (2020.01); *G06N 5/022* (2013.01)

(58) Field of Classification Search
CPC ........ G06F 40/30; G06F 16/35; G06F 18/214; G06F 18/22; G06F 18/2415; G06N 5/022; G06N 3/045
See application file for complete search history.

(56) References Cited

U.S. PATENT DOCUMENTS

2016/0179945 A1   6/2016   Lastra Diaz et al.
2017/0235824 A1*  8/2017   Liu .................. G06Q 40/00
                                                  707/723
(Continued)

FOREIGN PATENT DOCUMENTS

CN   108711420   10/2018
CN   109145292    1/2019
(Continued)

OTHER PUBLICATIONS

CNIPA, First Office Action for CN Application No. 202111647494.9, Aug. 2, 2022.
(Continued)

*Primary Examiner* — Huyen X Vo
(74) *Attorney, Agent, or Firm* — Hodgson Russ LLP (57) ABSTRACT

A method for generating a cross-lingual textual semantic model includes: acquiring a set of training data that includes pieces of monolingual non-parallel text and pieces of bilingual parallel text; determining a semantic vector of each piece of text in the set of training data by inputting each piece of text into an initial textual semantic model; determining a distance between semantic vectors of each two pieces of text in the set of training data based on the semantic vector of each piece of text in the set of training data; determining a gradient modification based on a parallel relationship between each two pieces of text in the set of training data and the distance between the semantic vectors of each two pieces of text in the set of training data; and acquiring a modified textual semantic model by modifying the initial textual semantic model based on the gradient modification.

15 Claims, 5 Drawing Sheets

(56) References Cited

U.S. PATENT DOCUMENTS

2021/0012235 A1* 1/2021 Abbas .................... G06N 20/00
2022/0019743 A1* 1/2022 Ouyang ................ G06F 40/237

FOREIGN PATENT DOCUMENTS

| CN | 109710923 | 5/2019 |
| CN | 112001181 | 11/2020 |
| CN | 112182255 | 1/2021 |
| CN | 112528681 | 3/2021 |
| CN | 113779978 | 12/2021 |

OTHER PUBLICATIONS

Jin et al., "Generation Model of Cross-lingual Sentence Embedding," Intelligent Computer and Applications, vol. 10, No. 7, Jul. 2020.

* cited by examiner

METHOD FOR GENERATING CROSS-LINGUAL TEXTUAL SEMANTIC MODEL, AND ELECTRONIC DEVICE

CROSS-REFERENCE TO RELATED APPLICATION

This application claims priority to Chinese Patent Application No. 202111647494.9, filed on Dec. 29, 2021, the entire disclosure of which is incorporated herein by reference.

TECHNICAL FIELD

The disclosure relates to the field of data processing technologies, particularly to the field of artificial intelligence (AI) technologies such as natural language processing (NLP) and deep learning (DL), and specifically to a method for generating a cross-lingual textual semantic model, and an electronic device.

BACKGROUND

AI technologies have played an extremely important role in various fields related to people's daily life with their constant development and improvement. For example, a cross-lingual semantic matching technology may provide reliable bilingual alignment text for fields such as machine translation, translator memory storage and cross-lingual information retrieval. Therefore, it has become an important research direction how to accurately acquire a semantic vector corresponding to cross-lingual text.

SUMMARY

According to a first aspect of the disclosure, a method for generating a cross-lingual textual semantic model is provided and includes: acquiring a set of training data, in which the set of training data includes pieces of monolingual non-parallel text and pieces of bilingual parallel text; determining a semantic vector of each piece of text in the set of training data by inputting each piece of text in the set of training data into an initial textual semantic model; determining a distance between semantic vectors of each two pieces of text in the set of training data based on the semantic vector of each piece of text in the set of training data; determining a gradient modification based on a parallel relationship between each two pieces of text in the set of training data and the distance between the semantic vectors of each two pieces of text in the set of training data; and acquiring a modified textual semantic model by modifying the initial textual semantic model based on the gradient modification.

According to a second aspect of the disclosure, a method for determining a textual semantic is provided and includes: acquiring text to be recognized; and determining a semantic vector corresponding to the text to be recognized by inputting the text to be recognized into a preset textual semantic model, in which the preset textual semantic model is generated based on the method as described in the first aspect.

According to a third aspect of the disclosure, an electronic device is provided and includes: at least one processor; and a memory communicatively connected to the at least one processor; in which the memory is stored with instructions executable by the at least one processor, and when the instructions are performed by the at least one processor, the at least one processor is caused to perform the method for generating a cross-lingual textual semantic model according to the first aspect, or the method for determining a textual semantic according to the second aspect.

According to a fourth aspect of disclosure, a non-transitory computer-readable storage medium stored with computer instructions is provided, in which the computer instructions are configured to cause a computer to perform the method for generating a cross-lingual textual semantic model according to the first aspect or perform the method for determining a textual semantic according to the second aspect.

It should be understood that, the content described in the part is not intended to identify key or important features of embodiments of the disclosure, nor intended to limit the scope of the disclosure. Other features of the disclosure will be easy to understand through the following specification.

BRIEF DESCRIPTION OF THE DRAWINGS

The drawings are intended to better understand solutions, and do not constitute a limitation to the disclosure.

DETAILED DESCRIPTION

Embodiments of the disclosure are described as below with reference to the accompanying drawings, which include various details of embodiments of the disclosure to facilitate understanding, and should be considered as merely exemplary. Therefore, those skilled in the art should realize that various changes and modifications may be made to the embodiments described herein without departing from the scope and spirit of the disclosure. Similarly, for clarity and conciseness, descriptions of well-known functions and structures are omitted in the following descriptions.

The embodiments of the disclosure generally relate to the field of AI technologies such as computer vision (CV) and DL.

AI is a new science of technology that studies and develops theories, methods, technologies and application systems configured to simulate, extend and expand human intelligence.

NLP is a cross discipline of computer science and linguistics that processes, understands and uses human languages (for example, Chinese, English) by a computer, often referred to as computational linguistics. Natural language is a fundamental symbol that human beings are different from other animals. Without language, there will be no human being's thinking. Therefore, NLP embodies the highest task and context of AI, that is, the machine may achieve true intelligence when the machine has the ability to handle natural language.

DL learns inherent law and representation hierarchy of sample data, and information acquired in the learning process is of great help in interpretation of data such as words, images or sound. The final goal of DL is that the machine may have analytic learning ability like human beings, which may recognize data such as words, images or sound.

A method and an apparatus for generating a cross-lingual textual semantic model, and an electronic device provided in some embodiments of the disclosure are described with reference to the accompanying drawings.

It should be noted that, an executive body of a method for generating a cross-lingual textual semantic model in some embodiments is an apparatus for generating a cross-lingual textual semantic model in some embodiments. The apparatus may be implemented by means of software and/or hardware and may be configured in an electronic device. The electronic device may include but not limited to a terminal, a server side or the like.

Figure 1:
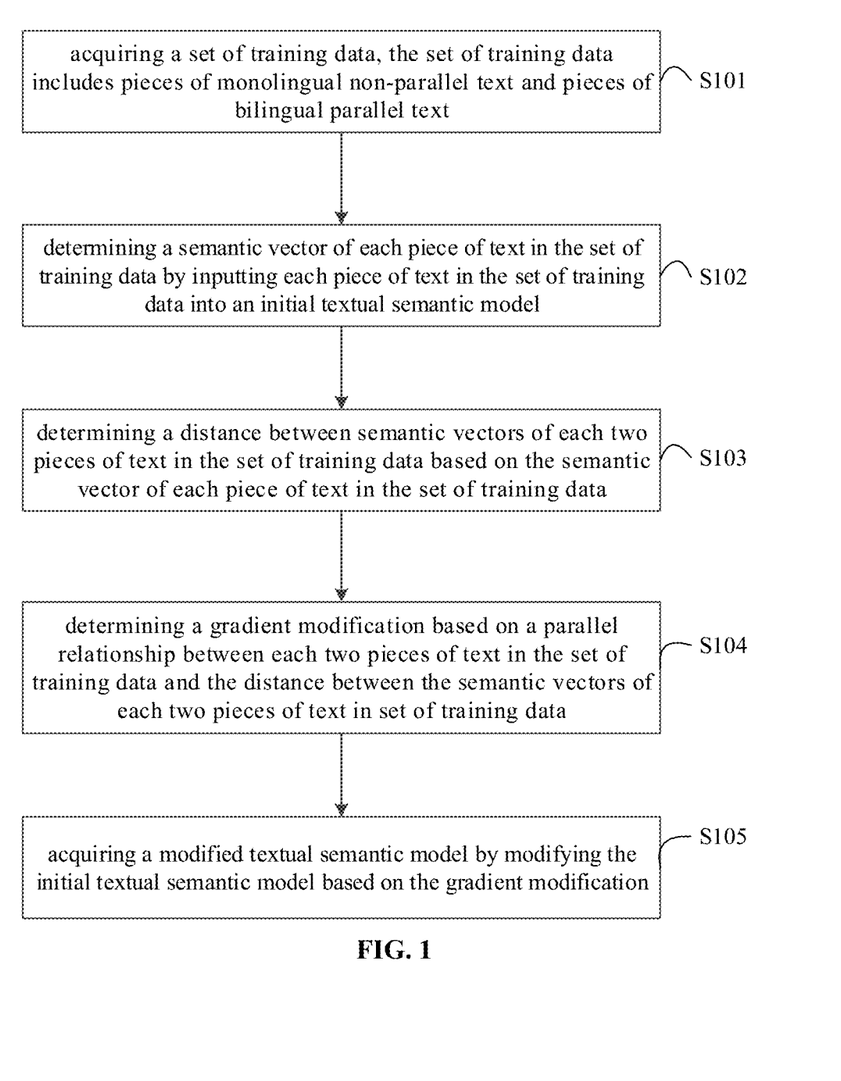
FIG. 1 is a flowchart of a method for generating a cross-lingual textual semantic model, according to some embodiments of the disclosure.

FIG. 1 is a flowchart of a method for generating a cross-lingual textual semantic model, according to some embodiments of the disclosure.

As illustrated in FIG. 1, the method includes the following.

At S101, a set of training data is acquired, in which the set of training data includes pieces of monolingual non-parallel text and pieces of bilingual parallel text.

The pieces of monolingual non-parallel text may include pieces of text corresponding to various languages. For example, pieces of English text, pieces of Chinese text or pieces of Korean text, which are not limited in the disclosure.

The pieces of bilingual parallel text include pieces of text in two languages with the same semantic. For example, "早上好" is Chinese, and English corresponding to "早上好" is "Good morning". In this case, "早上好" and "Good morning" are two pieces of bilingual parallel text.

In some embodiments of the disclosure, two language types of the bilingual parallel text are not limited. For example, they may be pieces of Chinese text and English text with the same semantic or pieces of English text and Korean text with the same semantic.

At S102, a semantic vector of each piece of text in the set of training data is determined by inputting each piece of text in the set of training data into an initial textual semantic model.

The semantic vector may be a representation of symbols in text in a semantic space.

Optionally, the initial textual semantic model may be a multilingual pre-trained model, such as ERNIE-M or Multilingual Bidirectional encoder representation from transformers (M-Bert), which is not limited in the disclosure.

At S103, a distance between semantic vectors of each two pieces of text in the set of training data is determined based on the semantic vector of each piece of text in the set of training data.

Optionally, a Euclidean distance calculation formula may be configured to determine the distance between the semantic vectors corresponding to each two pieces of text. Or, a Manhattan distance calculation formula may be configured to determine the distance between the semantic vectors corresponding to each two pieces of text. It is not limited in the disclosure.

It may be understood that, the distance between the semantic vectors corresponding to each two pieces of text may represent a similarity between the semantic vectors corresponding to each two pieces of text. The smaller the distance between the semantic vectors corresponding to each two pieces of text is, the greater the similarity between the semantic vectors corresponding to each two pieces of text is.

At S104, a gradient modification is determined based on a parallel relationship between each two pieces of text in the set of training data and the distance between the semantic vectors of each two pieces of text in set of training data.

The parallel relationship between each two pieces of text may include: two pieces of text being parallel, that is, two pieces of text are pieces of text in different languages representing the same semantic, such as "早上好" and "Good morning"; and two pieces of text being non-parallel, that is, two pieces of text represent different semantics, such as "早上好" and "Thanks", or, "早" "上好" and "谢谢 (Chinese, which means thanks)".

It may be understood that, two pieces of text with the parallel relationship represent the same semantic. To make two pieces of text with the parallel relationship to be represented by the same semantic vector as much as possible, and two pieces of text without the parallel relationship (or with the non-parallel relationship) to be represented by different semantic vectors as much as possible, in some embodiments of the disclosure, a contrastive learning loss mode may be adopted to train the initial textual semantic model. That is, the distance between semantic vectors corresponding to two pieces of text with the parallel relationship may be as small as possible, and the distance between semantic vectors corresponding to two pieces of text with the non-parallel relationship may be as large as possible.

Therefore, when the distance between semantic vectors corresponding to two pieces of text with the parallel relationship, output by the initial textual semantic model, is relatively large, a relatively large loss value may be given, and further the gradient modification is determined based on the loss value.

It needs to be noted that, when the set of training data includes a large number of pieces of text, if each piece of text included in the set of training data is successively input into the initial textual semantic model to train the initial textual semantic model, it may cause serious vibration of the initial textual semantic model and is not beneficial to train the initial textual semantic model. If all pieces of text in the set of training data are input into the initial textual semantic model, it may exceed a training ability of the initial textual semantic model.

Therefore, in the disclosure, the set of training data may be divided to acquire training subsets based on the number of pieces of text in the set of training data. The gradient modification of each of the training subsets is determined based on the parallel relationship between each two pieces of text in each of the training subsets and the distance between semantic vectors of each two pieces of text in each of the training subsets. Therefore, when the initial textual semantic model is trained based on each piece of text, the caused serious vibration of the initial textual semantic model is avoided, or, when all pieces of text are used to train simultaneously, it is avoided that the ability of the model exceeds. Thus, it is beneficial to train the model better.

It needs to be noted that, the number of pieces of text in each training subset may be the same, and also may be different, which is not limited in the disclosure.

At S105, a modified textual semantic model is acquired by modifying the initial textual semantic model based on the gradient modification.

It may be understood that, the initial textual semantic model is modified based on the gradient modification, which may improve the convergence and robustness of the textual semantic model.

It may be understood that, since the difficulty of acquiring pieces of monolingual non-parallel text is low, the initial textual semantic model may be trained based on a large number of monolingual non-parallel corpora in some embodiments of the disclosure, to enhance the comprehension ability of the generated textual semantic model on pieces of text in different languages; the generated textual semantic model may learn alignment relationships among different languages based on a small amount of bilingual data; and the initial textual semantic model is trained based on the contrastive learning loss mode, so that the distance between semantic vectors corresponding to two pieces of parallel text may be as small as possible, and the distance between semantic vectors corresponding to two pieces of non-parallel text may be as large as possible. Therefore, the generated textual semantic model may determine semantic vectors corresponding to pieces of multilingual text and improve the accuracy of semantic vectors.

In some embodiments of the disclosure, the set of training data including pieces of monolingual non-parallel text and pieces of bilingual parallel text is acquired, the semantic vector of each piece of text in the set of training data is determined by inputting each piece of text in the set of training data into the initial textual semantic model, the distance between semantic vectors of each two pieces of text in the set of training data is determined based on the semantic vector of each piece of text in the set of training data, the gradient modification is determined based on the parallel relationship between each two pieces of text in the set of training data and the distance between the semantic vectors of each two pieces of text in the set of training data, and the modified textual semantic model is acquired by modifying the initial textual semantic model based on the gradient modification. Therefore, based on a contrastive learning loss mode, the initial textual semantic model is modified based on the parallel relationship between each two pieces of text and the distance between the semantic vectors of corresponding each two pieces of text, so that the generated textual semantic model may process various language text, to accurately determine corresponding semantic vectors and provide conditions for cross-lingual textual semantic matching.

Figure 2:
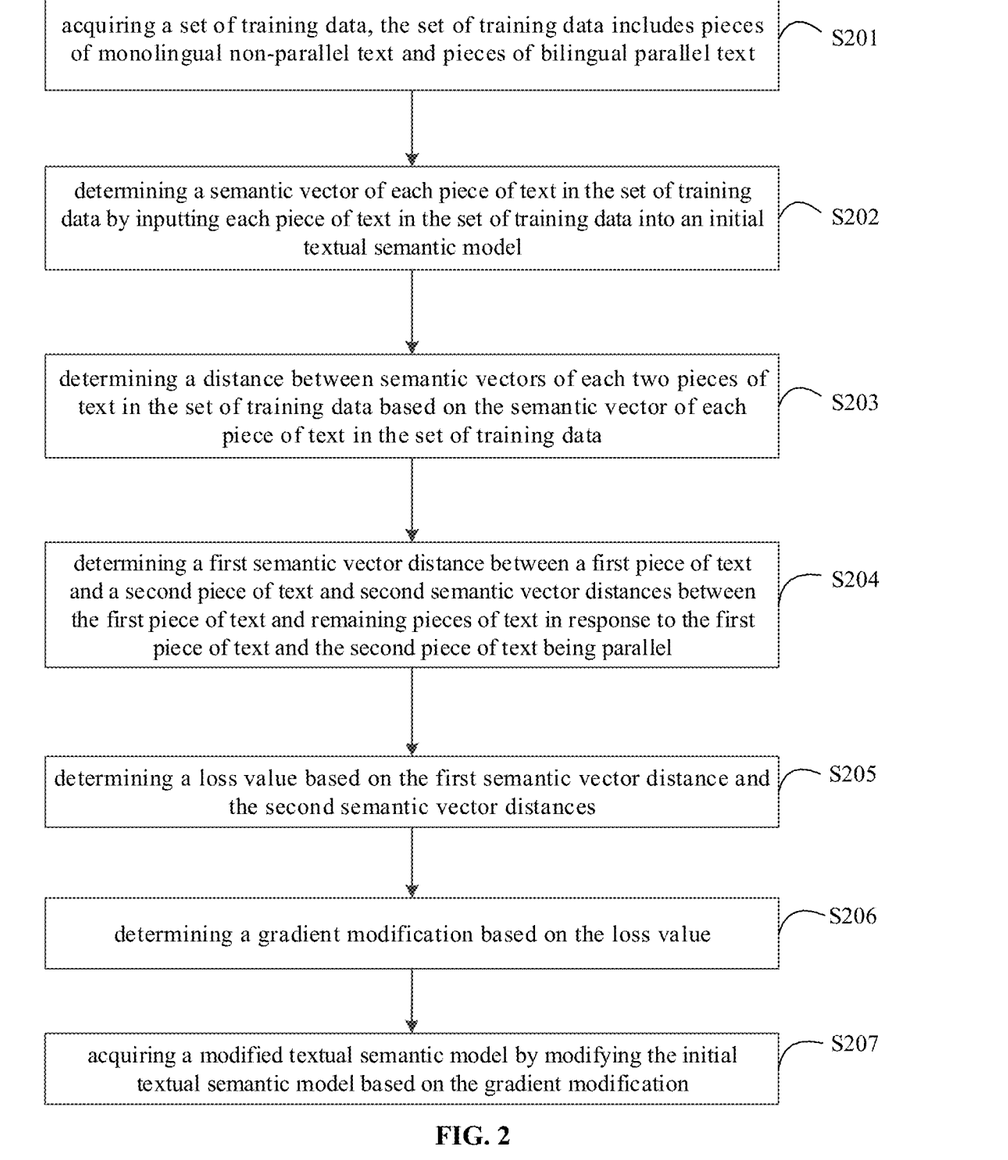
FIG. 2 is a flowchart of a method for generating a cross-lingual textual semantic model, according to some embodiments of the disclosure.

FIG. 2 is a flowchart of a method for generating a cross-lingual textual semantic model, according to some embodiments of the disclosure.

As illustrated in FIG. 2, the method includes the following.

At S201, a set of training data is acquired, in which the set of training data includes pieces of monolingual non-parallel text and pieces of bilingual parallel text.

At S202, a semantic vector of each piece of text in the set of training data is determined by inputting each piece of text in the set of training data into an initial textual semantic model.

In some embodiments of the disclosure, a multilingual pre-trained model ERNIE-M based on a paddle training frame may be adopted for the initial textual semantic model. Pieces of text in two languages in pieces of bilingual parallel text are spliced into one input sequence, and an alignment relationship between different languages is initially learned using a masked language model such as MMLM, ELM or CAMLM. A comprehension ability of the initial textual semantic model in different languages is further enhanced by means of back translation using a large number of pieces of monolingual non-parallel text.

Optionally, a CLS symbol bit at a top level in the initial textual semantic model may transform pieces of input text into corresponding semantic vectors.

At S203, a distance between semantic vectors of each two pieces of text in the set of training data is determined based on the semantic vector of each piece of text in the set of training data.

The specific implementation of S201 to S203 may refer to descriptions of other embodiments in the disclosure, which is not repeated herein.

At S204, a first semantic vector distance between a first piece of text and a second piece of text and second semantic vector distances between the first piece of text and remaining pieces of text are determined in response to the first piece of text and the second piece of text being parallel.

Optionally, a Euclidean distance calculation formula may be configured to determine the first semantic vector distance between the first piece of text and the second piece of text and the second semantic vector distances between the first piece of text and the remaining pieces of text. Or, a Manhattan distance calculation formula may be configured to determine the first semantic vector distance between the first piece of text and the second piece of text and the second semantic vector distances between the first piece of text and the remaining pieces of text. It not limited in the disclosure.

At S205, a loss value is determined based on the first semantic vector distance and the second semantic vector distances.

It needs to be noted that, in order to make two pieces of parallel text to be represented by the same semantic vector as much as possible, and two pieces of non-parallel text to be represented by different semantic vectors as much as possible, in the disclosure, the loss value is determined based on the first semantic vector distance and the second semantic vector distances.

Optionally, the loss value may be further determined based on a difference value between the first semantic vector distance and each of the second semantic vector distances.

It may be understood that, if the difference value between the first semantic vector distance and each of the second semantic vector distances is smaller, it indicates that, the distance between semantic vectors of pieces of parallel text output by the model is close to the distance between semantic vectors of pieces of non-parallel text output by the model, thus it may be determined that the loss value shall be greater, so that the distance between first semantic vectors corresponding to two pieces of parallel text determined by the modified initial textual semantic model based on the loss value is smaller, and the distance between second semantic vectors corresponding to two pieces of non-parallel text is greater, and further the first semantic vector distance is far smaller than each of the second semantic vector distances.

Or, the loss value may be determined based on a difference value between the first semantic vector distance and a first threshold and a difference value between each of the second semantic vector distances and a second threshold.

The first threshold may be a preset threshold, for example, 0.15, 0.1, which is not limited in the disclosure. The second threshold may be a preset threshold, for example, 0.9, 0.95, which is not limited in the disclosure.

It needs to be noted that, in order to make the first semantic vector distance far smaller than the second semantic vector distance, the first threshold shall be smaller than the second threshold.

It needs to be noted that, the greater the difference value between the first semantic vector distance and the first threshold, the greater the difference value between each of the second semantic vector distances and the second threshold, the greater the determined loss value.

Or, the loss value may be determined based on a ratio of a first semantic vector distance to a sum of semantic vector distances, in which the sum of semantic vector distances is a sum of the first semantic vector distance and the second semantic vector distances.

Optionally, the loss value may be determined based on the ratio of the first semantic vector distance to the sum of semantic vector distances based on a softmax classifier.

For example, the first piece of text is "早上好", the second piece of text parallel with the first piece of text is "Good morning", and remaining pieces of text are "Hello world", and "Thanks". When the first semantic vector distance corresponding to "早上好" and "Good morning", the second semantic vector distance corresponding to "早上好" and "Hello world", and the second semantic vector distance corresponding to "早上好" and "Thanks" are input into the softmax classifier, output of the softmax classifier may be:

$$\text{Soft max} = \frac{d_1}{d_1 + d_2 + d_3}$$

where, the output of the softmax classifier is the ratio of the first semantic vector distance to the sum of semantic vector distances, $d_1$ is the first semantic vector distance corresponding to "早上好" and "Good morning", $d_2$ is the second semantic vector distance corresponding to "早上好" and "Hello world", and $d_3$ is the second semantic vector distance corresponding to "早上好" and "Thanks".

At S206, a gradient modification is determined based on the loss value.

At S207, a modified textual semantic model is acquired by modifying initial textual semantic model based on the gradient modification.

The specific implementation of S207 may refer to descriptions of other embodiments in the disclosure, which is not repeated herein.

Figure 3:
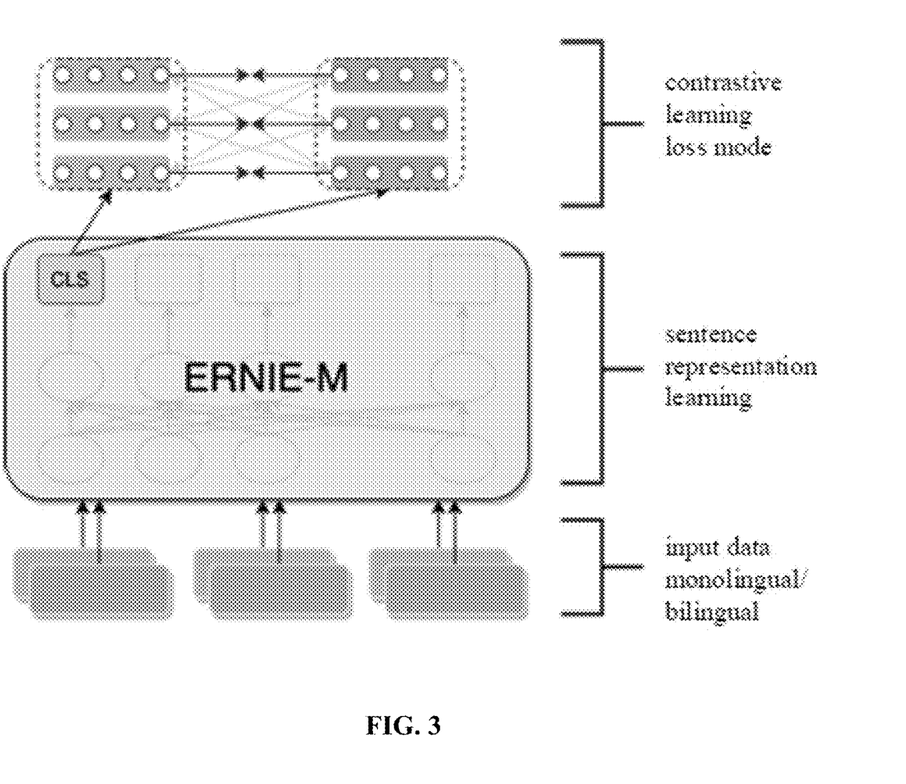
FIG. 3 is a flowchart of a method for determining a textual semantic, according to some embodiments of the disclosure.

FIG. 3 is a flowchart of a method for generating a cross-lingual textual semantic model, according to some embodiments of the disclosure. As illustrated in FIG. 3, input data such as pieces of monolingual non-parallel text and pieces of bilingual parallel text are input into ERNIE-M, sentence representation learning is performed on the input data by ERNIE-M, the semantic vector corresponding to each piece of text is acquired based on the CLS symbol bit of ERNIE-M, and the loss value is determined based on the first semantic vector distance corresponding to pieces of parallel text and the second semantic vector distances corresponding to pieces of non-parallel text based on a contrastive learning loss mode.

In some embodiments of the disclosure, the set of training data including pieces of monolingual non-parallel text and pieces of bilingual parallel text is acquired, the semantic vector of each piece of text in the set of training data is determined by inputting each piece of text in the set of training data into the initial textual semantic model, the distance between semantic vectors of each two pieces of text in the set of training data is determined based on the semantic vector of each piece of text in the set of training data, the loss value is determined based on the first semantic vector distance between the first piece of text and the second piece of text which are parallel and the second semantic vector distances between the first piece of text and the remaining pieces of text, the gradient modification is determined based on the loss value, and the modified textual semantic model is acquired by modifying the initial textual semantic model based on the gradient modification. Therefore, the loss value is determined based on the first semantic vector distance between pieces of parallel text and the second semantic vector distance between pieces of non-parallel text based on the contrastive learning loss, and further the initial textual semantic model is modified, so that the generated textual semantic model may determine semantic vectors corresponding to pieces of multilingual text and improve the accuracy of semantic vectors.

Figure 4:
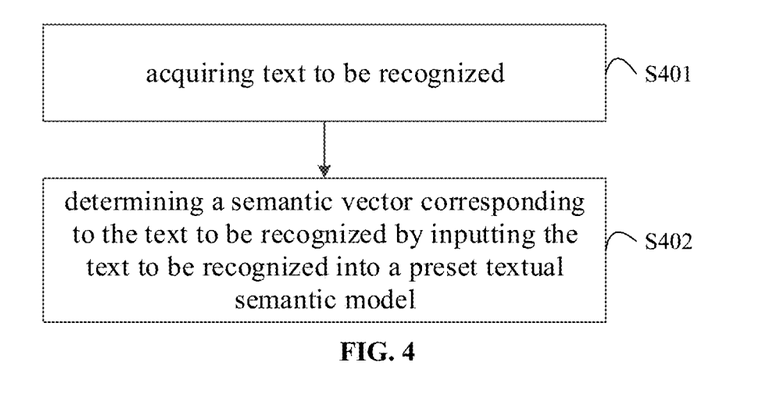
FIG. 4 is a flowchart of a method for determining a textual semantic, according to some embodiments of the disclosure.

FIG. 4 is a flowchart of a method for determining a textual semantic, according to some embodiments of the disclosure.

As illustrated in FIG. 4, the method includes the following.

At S401, text to be recognized is acquired.

The text to be recognized may be text that is required to be processed to acquire a semantic vector. Optionally, the text to be recognized may be English text, Chinese text or French text, which is not limited in the disclosure.

Optionally, the text to be recognized may be acquired from books, cartoon and network information. Optionally, the text to be recognized included in voice data may be acquired by recognizing voice data. It not limited in the disclosure.

Optionally, the text to be recognized may be one word, one sentence, or one paragraph of text, which is not limited in the disclosure.

At S402, a semantic vector corresponding to the text to be recognized is determined by inputting the text to be recognized into a preset textual semantic model.

The preset textual semantic model is generated based on the method for generating a cross-lingual textual semantic model provided in the above embodiments of the disclosure.

In some embodiments of the disclosure, the text to be recognized is acquired, and the semantic vector corresponding to the text to be recognized is determined by inputting the text to be recognized into the preset textual semantic model. Therefore, the text to be recognized is processed by the textual semantic model, so that the semantic vector corresponding to the text to be recognized is more accurate.

Figure 5:
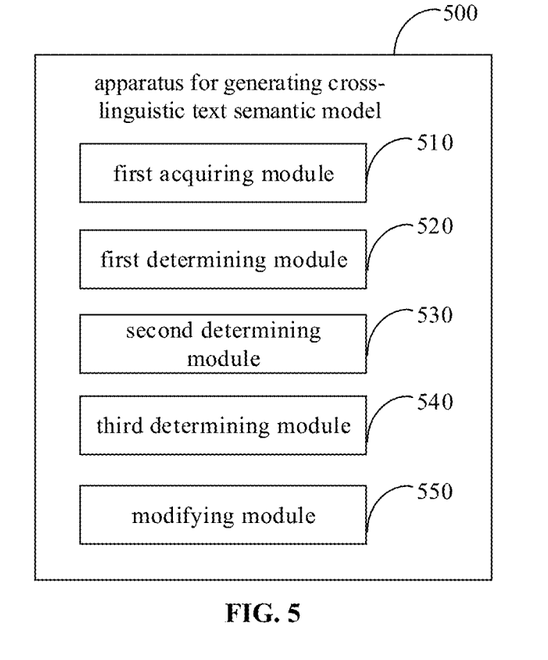
FIG. 5 is a schematic diagram of a structure of an apparatus for generating a cross-lingual textual semantic model, according to some embodiments of the disclosure.

FIG. 5 is a schematic diagram of a structure of an apparatus for generating a cross-lingual textual semantic model, according to some embodiments of the disclosure.

As illustrated in FIG. 5, the apparatus 500 for generating a cross-lingual textual semantic model includes a first acquiring module 510, a first determining module 520, a second determining module 530, a third determining module 540, and a modifying module 550.

The first acquiring module 510 is configured to acquire a set of training data, in which the set of training data includes pieces of monolingual non-parallel text and pieces of bilingual parallel text; the first determining module 520 is configured to determine a semantic vector of each piece of text in the set of training data by inputting each piece of text in the set of training data into initial textual semantic model; the second determining module 530 is configured to determine a distance between semantic vectors of each two pieces of text in the set of training data based on the semantic vector of each piece of text in the set of training data; the third determining module 540 is configured to determine a gradient modification based on a parallel relationship between each two pieces of text in the set of training data and the distance between the semantic vectors of each two pieces of text in set of training data; and the modifying module 550 is configured to acquire a modified textual semantic model by modifying the initial textual semantic model based on the gradient modification.

Optionally, the third determining module 540 includes a first determining unit, a second determining unit, and a third determining unit.

The first determining unit is configured to determine a first semantic vector distance between a first piece of text and a second piece of text and second semantic vector distances between the first piece of text and remaining pieces of text in response to the first piece of text and the second piece of text being parallel; the second determining unit is configured to determine a loss value based on first semantic vector distance and second semantic vector distances; and the third determining unit is configured to determine a gradient modification based on loss value.

Optionally, the second determining unit is specifically configured to: determine the loss value based on a difference value between first semantic vector distance and each of the second semantic vector distances; or, determine the loss value based on a difference value between the first semantic vector distance and a first threshold and a difference value between each of first semantic vector distances and a second threshold; or, determine a loss value based on a ratio of a first semantic vector distance to a sum of semantic vector distances, the sum of semantic vector distances is a sum of the first semantic vector distance and the second semantic vector distances.

Optionally, the third determining module is specifically configured to: acquire a plurality of training subsets by dividing the set of training data based on a number of pieces of text comprised in the set of training data; and determine a gradient modification of each of the plurality of training subsets based on a parallel relationship between each two pieces of text in each of the plurality of training subsets and a distance between semantic vectors of each two pieces of text in each of the plurality of training subsets.

It needs to be noted that the foregoing explanation of the method for generating a cross-lingual textual semantic model is also applied to an apparatus for generating a cross-lingual textual semantic model in embodiments, which will not be repeated herein.

In some embodiments of the disclosure, the set of training data including pieces of monolingual non-parallel text and pieces of bilingual parallel text is acquired, the semantic vector of each piece of text in the set of training data is determined by inputting each piece of text in the set of training data into the initial textual semantic model, the distance between semantic vectors of each two pieces of text in the set of training data is determined based on the semantic vector of each piece of text in the set of training data, the gradient modification is determined based on the parallel relationship between each two pieces of text in the set of training data and the distance between the semantic vectors of each two pieces of text in the set of training data, and the modified textual semantic model is acquired by modifying the initial textual semantic model based on the gradient modification. Therefore, based on a contrastive learning loss mode, the initial textual semantic model is modified based on the parallel relationship between each two pieces of text and the distance between the semantic vectors of corresponding each two pieces of text, so that the generated textual semantic model may process various language text, to accurately determine corresponding semantic vectors and provide conditions for cross-lingual textual semantic matching.

Figure 6:
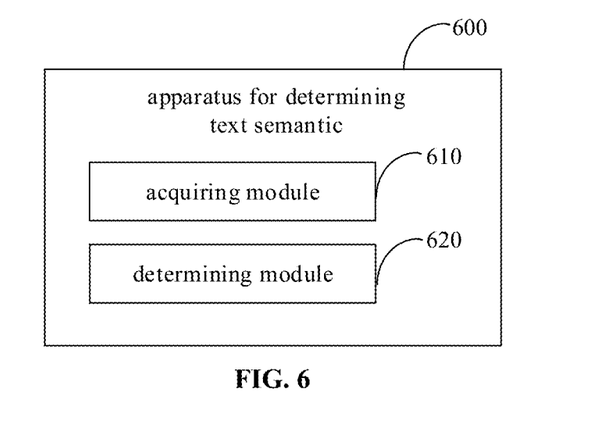
FIG. 6 is a schematic diagram of a structure of an apparatus for determining a textual semantic, according to some embodiments of the disclosure.

FIG. 6 is a schematic diagram of a structure of an apparatus for determining a textual semantic, according to some embodiments of the disclosure. As illustrated in FIG. 6, the apparatus 600 for determining a textual semantic includes an acquiring module 610 and a determining module 620.

The acquiring module 610 is configured to acquire text to be recognized; and the determining module 620 is configured to determine a semantic vector corresponding to the text to be recognized by inputting the text to be recognized into a preset textual semantic model, in which the preset textual semantic model is generated based on the apparatus as illustrated in FIG. 5.

In some embodiments of the disclosure, the text to be recognized is acquired, and the semantic vector corresponding to the text to be recognized is determined by inputting the text to be recognized into the preset textual semantic model. Therefore, the text to be recognized is processed by the textual semantic model, so that the semantic vector corresponding to the text to be recognized is more accurate.

An electronic device, a readable storage medium and a computer program product are further provided according to embodiments of the disclosure.

Figure 7:
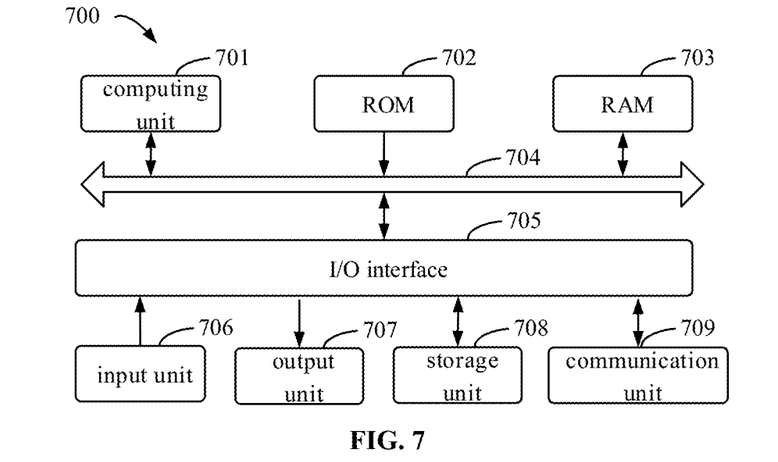
FIG. 7 is a block diagram of an electronic device configured to implement a method for generating a cross-lingual textual semantic model in some embodiments of the disclosure.

FIG. 7 is a schematic block diagram illustrating an example electronic device 700 in some embodiments of the disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 7, a device 700 includes a computing unit 701, configured to execute various appropriate actions and processes according to a computer program stored in a read-only memory (ROM) 702 or loaded from a memory unit 708 to a random access memory (RAM) 703. In a RAM 703, various programs and data required for a device 700 may be stored. A computing unit 701, a ROM 702 and a RAM 703 may be connected with each other by a bus 704. An input/output (I/O) interface 705 is also connected to a bus 704.

A plurality of components in the device 700 are connected to an I/O interface 705, and includes: an input unit 706, for example, a keyboard, a mouse, etc.; an output unit 707, for example various types of displays, speakers; a memory unit 708, for example a magnetic disk, an optical disk; and a communication unit 709, for example, a network card, a modem, a wireless transceiver. A communication unit 709 allows a device 700 to exchange information/data through a computer network such as internet and/or various types of telecommunication networks and other devices.

A computing unit 701 may be various types of general and/or dedicated processing components with processing and computing ability. Some examples of a computing unit 701 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 701 executes various methods and processes as described above, for example, a method for generating a cross-lingual textual semantic model or a method for determining a textual semantic. For example, in some embodiments, the method for generating a cross-lingual textual semantic model or the method for determining a textual semantic may be further implemented as a computer software program, which is physically contained in a machine readable medium, such as a storage unit 708. In some embodiments, a part or all of the computer program may be loaded and/or installed on the device 700 through a ROM 702 and/or a communication unit 709. When the computer program is loaded on a RAM 703 and executed by a computing unit 701, one or more blocks in the method for generating a cross-lingual textual semantic model or the method for determining a textual semantic as described above may be performed. Alternatively, in other embodiments, a computing unit 701 may be configured to perform a method for generating cross-lingual textual semantic model or a method for determining a textual semantic in other appropriate ways (for example, by virtue of a firmware).

Various implementation modes of systems and technologies described herein may be implemented in a digital electronic circuit system, an integrated circuit system, a field programmable gate array (FPGA), a dedicated application specific integrated circuit (ASIC), a system on a chip (SoC), a load programmable logic device (CPLD), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the disclosure may be written with one or any combination of multiple programming languages. These programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be executed completely or partly on the machine, executed partly on the machine as an independent software package and executed partly or completely on the remote machine or server.

In the context of the disclosure, a machine-readable medium may be a tangible medium that may contain or store a program intended for use in or in conjunction with an instruction execution system, apparatus, or device. A machine-readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an erasable programmable read-only memory (an EPROM or a flash memory), an optical fiber device, and a portable optical disk read-only memory (CDROM), an optical storage device, a magnetic storage device, or any appropriate combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, also known as a cloud computing server or a cloud host, is a host product in a cloud computing service system, to solve the shortcomings of large management difficulty and weak business expansibility existed in the traditional physical host and Virtual Private Server (VPS) service. A server further may be a server with a distributed system, or a server in combination with a blockchain.

In some embodiments of the disclosure, the set of training data including pieces of monolingual non-parallel text and pieces of bilingual parallel text is acquired, the semantic vector of each piece of text in the set of training data is determined by inputting each piece of text in the set of training data into the initial textual semantic model, the distance between semantic vectors of each two pieces of text in the set of training data is determined based on the semantic vector of each piece of text in the set of training data, the gradient modification is determined based on the parallel relationship between each two pieces of text in the set of training data and the distance between the semantic vectors of each two pieces of text in the set of training data, and the modified textual semantic model is acquired by modifying the initial textual semantic model based on the gradient modification. Therefore, based on a contrastive learning loss mode, the initial textual semantic model is modified based on the parallel relationship between each two pieces of text and the distance between the semantic vectors of corresponding each two pieces of text, so that the generated textual semantic model may process various language text, to accurately determine corresponding semantic vectors and provide conditions for cross-lingual textual semantic matching.

It should be understood that, various forms of procedures shown above may be configured to reorder, add or delete blocks. For example, blocks described in the disclosure may be executed in parallel, sequentially, or in a different order, as long as the desired result of the technical solution disclosed in the disclosure may be achieved, which will not be limited herein.

In addition, the terms "first" and "second" used in the disclosure are only for description purpose, and may not be understood as relative importance of indication or implication or number of technical features indicated by implication. Therefore, features limiting "first" and "second" may explicitly or implicitly include at least one of the features. In the description of the disclosure, "a plurality of" means at least two, for example two, three, etc., unless otherwise specified. In the description of the disclosure, "if" and "on condition that" as used herein may be interpreted as "when" or "in response to determination" or "in case that".

The above specific implementations do not constitute a limitation on the protection scope of the disclosure. Those skilled in the art should understand that various modifications, combinations, sub-combinations and substitutions may be made according to design requirements and other factors. Any modification, equivalent replacement, improvement, etc., made within the spirit and principle of embodiments of the disclosure shall be included within the protection scope of embodiments of the disclosure.

The invention claimed is:

1. A method for generating a cross-lingual textual semantic model, comprising:
    acquiring a set of training data, wherein the set of training data comprises pieces of monolingual non-parallel text and pieces of bilingual parallel text;
    determining a semantic vector of each piece of text in the set of training data by inputting each piece of text in the set of training data into an initial textual semantic model;
    determining a distance between semantic vectors of each two pieces of text in the set of training data based on the semantic vector of each piece of text in the set of training data;
    determining a gradient modification based on a parallel relationship between each two pieces of text in the set of training data and the distance between the semantic vectors of each two pieces of text in the set of training data; and
    acquiring a modified textual semantic model by modifying the initial textual semantic model based on the gradient modification.

2. The method of claim 1, wherein, determining the gradient modification based on the parallel relationship between each two pieces of text in the set of training data and the distance between the semantic vectors of each two pieces of text in the set of training data, comprises:
    determining a first semantic vector distance between a first piece of text and a second piece of text and second semantic vector distances between the first piece of text and remaining pieces of text in response to the first piece of text and the second piece of text being parallel;
    determining a loss value based on the first semantic vector distance and the second semantic vector distances; and
    determining the gradient modification based on the loss value.

3. The method of claim 2, wherein, determining the loss value based on the first semantic vector distance and the second semantic vector distances, comprises:
    determining the loss value based on a difference value between the first semantic vector distance and each of the second semantic vector distances; or
    determining the loss value based on a difference value between the first semantic vector distance and a first threshold and a difference value between each of the second semantic vector distances and a second threshold; or
    determining the loss value based on a ratio of the first semantic vector distance to a sum of semantic vector distances, wherein, the sum of semantic vector distances is a sum of the first semantic vector distance and the second semantic vector distances.

4. The method of claim 1, wherein, determining the gradient modification based on the parallel relationship between each two pieces of text in the set of training data and the distance between the semantic vectors of each two pieces of text in the set of training data, comprises:
    acquiring a plurality of training subsets by dividing the set of training data based on a number of pieces of text comprised in the set of training data; and
    determining a gradient modification of each of the plurality of training subsets based on a parallel relationship between each two pieces of text in each of the plurality of training subsets and a distance between semantic vectors of each two pieces of text in each of the plurality of training subsets.

5. The method of claim 1, further comprising:
    acquiring text to be recognized; and
    determining a semantic vector corresponding to the text to be recognized by inputting the text to be recognized into the modified textual semantic model.

6. An electronic device, comprising:
    a processor; and
    a memory for storing instructions executable by the processor;
    wherein the processor is configured to:
    acquire a set of training data, wherein the set of training data comprises pieces of monolingual non-parallel text and pieces of bilingual parallel text;
    determine a semantic vector of each piece of text in the set of training data by inputting each piece of text in the set of training data into an initial textual semantic model;
    determine a distance between semantic vectors of each two pieces of text in the set of training data based on the semantic vector of each piece of text in the set of training data;
    determine a gradient modification based on a parallel relationship between each two pieces of text in the set of training data and the distance between the semantic vectors of each two pieces of text in the set of training data; and
    acquire a modified textual semantic model by modifying the initial textual semantic model based on the gradient modification.

7. The device of claim 6, wherein the processor is configured to:
    determine a first semantic vector distance between a first piece of text and a second piece of text and second semantic vector distances between the first piece of text and remaining pieces of text in response to the first piece of text and the second piece of text being parallel;

determine a loss value based on the first semantic vector distance and the second semantic vector distances; and determine the gradient modification based on the loss value.

8. The device of claim 7, wherein the processor is configured to:

determine the loss value based on a difference value between the first semantic vector distance and each of the second semantic vector distances; or determine the loss value based on a difference value between the first semantic vector distance and a first threshold and a difference value between each of the second semantic vector distances and a second threshold; or determine the loss value based on a ratio of the first semantic vector distance to a sum of semantic vector distances, wherein, the sum of semantic vector distances is a sum of the first semantic vector distance and the second semantic vector distances.

9. The device of claim 6, wherein the processor is configured to:

acquire a plurality of training subsets by dividing the set of training data based on a number of pieces of text comprised in the set of training data; and determine a gradient modification of each of the plurality of training subsets based on a parallel relationship between each two pieces of text in each of the plurality of training subsets and a distance between semantic vectors of each two pieces of text in each of the plurality of training subsets.

10. The device of claim 6, wherein the processor is configured to:

acquire text to be recognized; and determine a semantic vector corresponding to the text to be recognized by inputting the text to be recognized into the modified textual semantic model.

11. A non-transitory computer-readable storage medium stored with computer instructions, wherein, the computer instructions are configured to cause a computer to perform a method for generating a cross-lingual textual semantic model, the method comprising:

acquiring a set of training data, wherein the set of training data comprises pieces of monolingual non-parallel text and pieces of bilingual parallel text;

determining a semantic vector of each piece of text in the set of training data by inputting each piece of text in the set of training data into an initial textual semantic model;

determining a distance between semantic vectors of each two pieces of text in the set of training data based on the semantic vector of each piece of text in the set of training data;

determining a gradient modification based on a parallel relationship between each two pieces of text in the set of training data and the distance between the semantic vectors of each two pieces of text in the set of training data; and acquiring a modified textual semantic model by modifying the initial textual semantic model based on the gradient modification.

12. The storage medium of claim 11, wherein, determining the gradient modification based on the parallel relationship between each two pieces of text in the set of training data and the distance between the semantic vectors of each two pieces of text in the set of training data, comprises:

determining a first semantic vector distance between a first piece of text and a second piece of text and second semantic vector distances between the first piece of text and remaining pieces of text in response to the first piece of text and the second piece of text being parallel;

determining a loss value based on the first semantic vector distance and the second semantic vector distances; and determining the gradient modification based on the loss value.

13. The storage medium of claim 12, wherein, determining the loss value based on the first semantic vector distance and the second semantic vector distances, comprises:

determining the loss value based on a difference value between the first semantic vector distance and each of the second semantic vector distances; or determining the loss value based on a difference value between the first semantic vector distance and a first threshold and a difference value between each of the second semantic vector distances and a second threshold; or determining the loss value based on a ratio of the first semantic vector distance to a sum of semantic vector distances, wherein, the sum of semantic vector distances is a sum of the first semantic vector distance and the second semantic vector distances.

14. The storage medium of claim 11, wherein, determining the gradient modification based on the parallel relationship between each two pieces of text in the set of training data and the distance between the semantic vectors of each two pieces of text in the set of training data, comprises:

acquiring a plurality of training subsets by dividing the set of training data based on a number of pieces of text comprised in the set of training data; and determining a gradient modification of each of the plurality of training subsets based on a parallel relationship between each two pieces of text in each of the plurality of training subsets and a distance between semantic vectors of each two pieces of text in each of the plurality of training subsets.

15. The storage medium of claim 11, wherein, the method further comprises:

acquiring text to be recognized; and determining a semantic vector corresponding to the text to be recognized by inputting the text to be recognized into the modified textual semantic model.

* * * * *